Nov. 25, 1924.
H. T. HATCHER
FOLDING HORSE
Filed Oct. 2, 1923
1,517,156
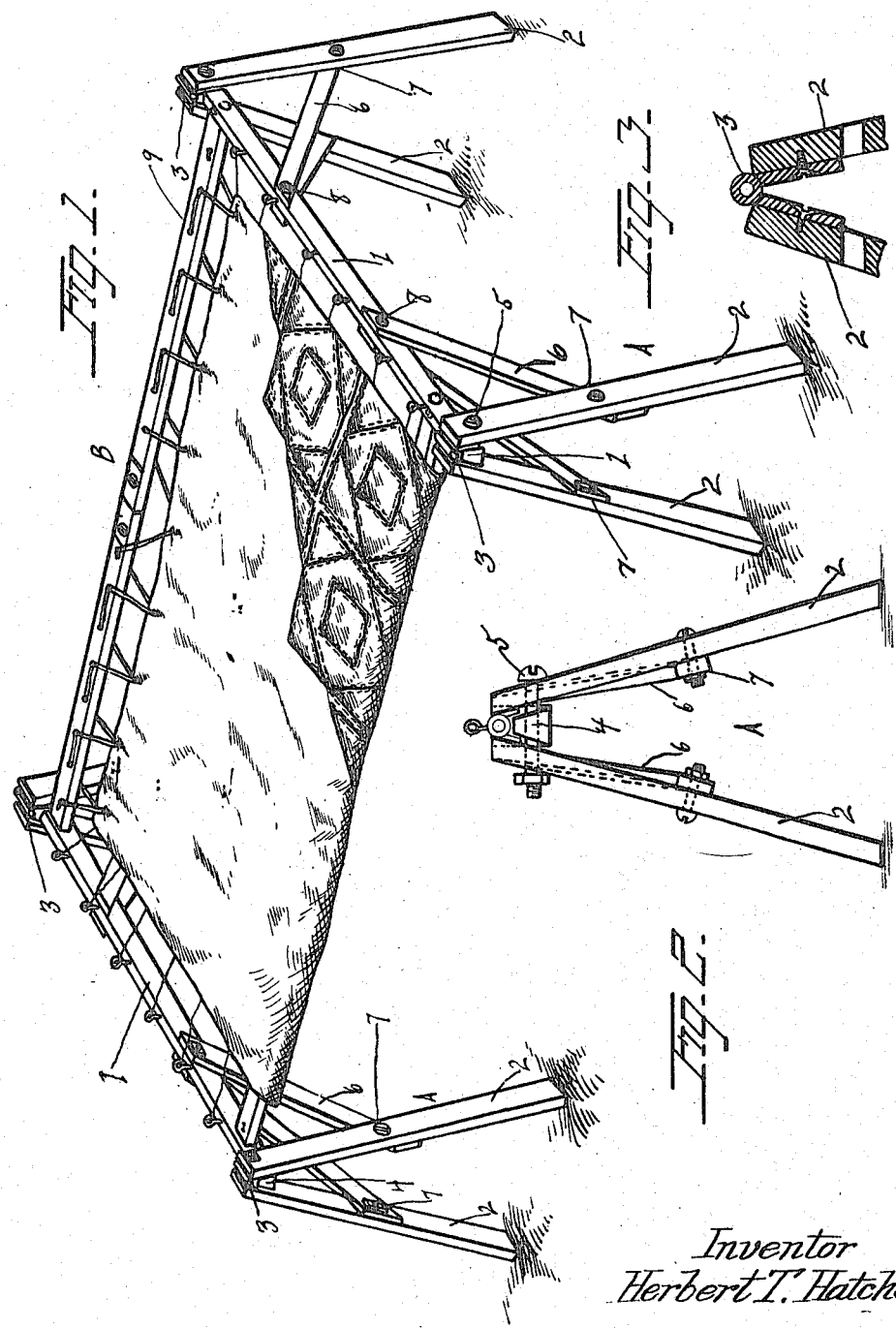
Inventor
Herbert T. Hatcher
By E. Hume Talbert,
Atty.

Patented Nov. 25, 1924.

1,517,156

UNITED STATES PATENT OFFICE.

HERBERT T. HATCHER, OF KANSAS CITY, MISSOURI.

FOLDING HORSE.

Application filed October 2, 1923. Serial No. 666,134.

*To all whom it may concern:*

Be it known that HERBERT T. HATCHER, a citizen of the United States of America, residing at Kansas City, in the county of Jackson and State of Missouri, has invented new and useful Improvements in Folding Horses, of which the following is a specification.

The object of the invention is to provide a horse for the purpose indicated and of such a construction as may be readily disassembled and the different parts collapsed so as to be readily bound up in a compact mass or bundle for storage in a small place or for transportation from place to place as desired.

With this object in view the invention consists in a construction and combination of parts of which a preferred embodiment is shown in the accompanying drawings, wherein:—

Figure 1 is a perspective view illustrating the invention as the supporting means for a quilting frame.

Figure 2 is an end elevational view of the horse.

Figure 3 is a vertical sectional view of the hinge joint between the connecting legs of the horse.

Essentially the invention embodies the horse A which may be used for various purposes and, being provided with holes to accommodate rails B, is especially adapted to support a quilting frame. The transverse bars 1 are supported on standards consisting of upwardly converging legs 2, hinged at their upper extremities as indicated at 3, strap hinges preferably being employed and secured to the adjacent faces of the legs. The transverse bar is beveled at its extremities on opposite faces to provide an upwardly wedge-shaped element 4 which seats between the leaves of the hinge when the legs are spread to the angle which they assume when the several parts of the horses are assembled. A detachable bolt 5 is inserted through appropriate holes in the legs and wedge-shaped portion of the transverse bar 1 and secures the legs against spreading movement and also supports the weight of the transverse bar. In order to hold the standard-elements consisting of the two legs 2 in perpendicular position with reference to the transverse bar 1, brace members 6 are provided, one being pivoted to each leg 2 on the inner face of the latter as indicated at 7 and extending to the side face of the transverse bar 1 in order that the bolt 8 may be attached, this bolt passing through appropriate openings formed adjacent the extremities of the brace bars 6 and through a registering opening in the transverse bar 1.

To collapse the horse, the bolts 8 are removed, when the brace members 6 may be swung down into parallelism with the legs 2. The bolts 5 are then removed which releases the transverse bar 1 and permit the legs to swing towards each other on the hinge 3. The brace members 6 and legs are thus in compact form and together with the associated transverse bar 1 constitute a compact bundle when it is desired to store the same or to transport the horse.

Having described the invention, what is claimed as new and useful is:—

1. A device for the purpose indicated comprising a horse having a transverse bar and a supporting standard therefor consisting of a duality of hingedly connected legs, the bar having a wedge-shaped element engaging in the crotch between said legs, and a detachable bolt passing through the legs and through the wedge-shaped portion of the bar.

2. A device for the purpose indicated comprising a horse having a transverse bar and a supporting standard therefor consisting of a duality of hingedly connected legs, the bar having a wedge-shaped element engaging in the crotch between said legs, and a detachable bolt passing through the legs and through the wedge-shaped portion of the bar, and brace members for disposing the legs in perpendicularity with the cross bar and having pivotal connections with the legs and a detachable connection with the cross bar.

In testimony whereof he affixes his signature.

HERBERT T. HATCHER.